United States Patent [19]

Jeremiah et al.

[11] 4,063,311
[45] Dec. 13, 1977

[54] ASYNCHRONOUSLY OPERATING SIGNAL DIAGNOSTIC SYSTEM FOR A PROGRAMMABLE MACHINE FUNCTION CONTROLLER

[75] Inventors: Edward Scott Jeremiah, Cincinnati; Kenneth Erwin Schubeler, West Chester; Eric Randall Kline, Cincinnati, all of Ohio

[73] Assignee: Cincinnati Milacron Inc., Cincinnati, Ohio

[21] Appl. No.: 715,133

[22] Filed: Aug. 17, 1976

[51] Int. Cl.² .................. G05B 11/00; G06F 9/00; G06F 11/00
[52] U.S. Cl. .................. 364/900; 235/304.1; 364/107
[58] Field of Search .................. 340/172.5; 445/1; 235/151.1, 151.11, 153 A, 153 AC, 153 AK, 151.3

[56] References Cited

U.S. PATENT DOCUMENTS

| | | | |
|---|---|---|---|
| 3,701,113 | 10/1972 | Chace et al. | 340/172.5 |
| 3,829,842 | 8/1974 | Langdon et al. | 340/172.5 |
| 3,849,765 | 11/1974 | Hamano | 340/172.5 |
| 3,939,453 | 2/1976 | Schroeder | 340/172.5 |

Primary Examiner—Melvin B. Chapnick
Attorney, Agent, or Firm—C. Richard Eby

[57] ABSTRACT

A diagnostic apparatus for use with a programmable machine function controller having a memory for storing a machine control program wherein the controller continuously scans the memory and generates output signals in response to input signals having signal states corresponding to the desired states as defined by the machine control program. The diagnostic apparatus includes a second program for testing the input signals as they are required by the machine control program to execute cycle steps and cycles of operation relative to the machine. The diagnostic apparatus operates asynchronously with the machine function controller to sequentially check the cycles of operation, many of which may be occurring simultaneously. In checking each cycle of operation, the diagnostic apparatus checks each cycle step and further checks the state of each input signal associated with each cycle step. The diagnostic apparatus is operative to continuously display a representation of the failure conditions detected. Finally, the apparatus detects and displays a representation of input signal failures which are independent of any of the cycles of operation associated with the machine.

14 Claims, 6 Drawing Figures

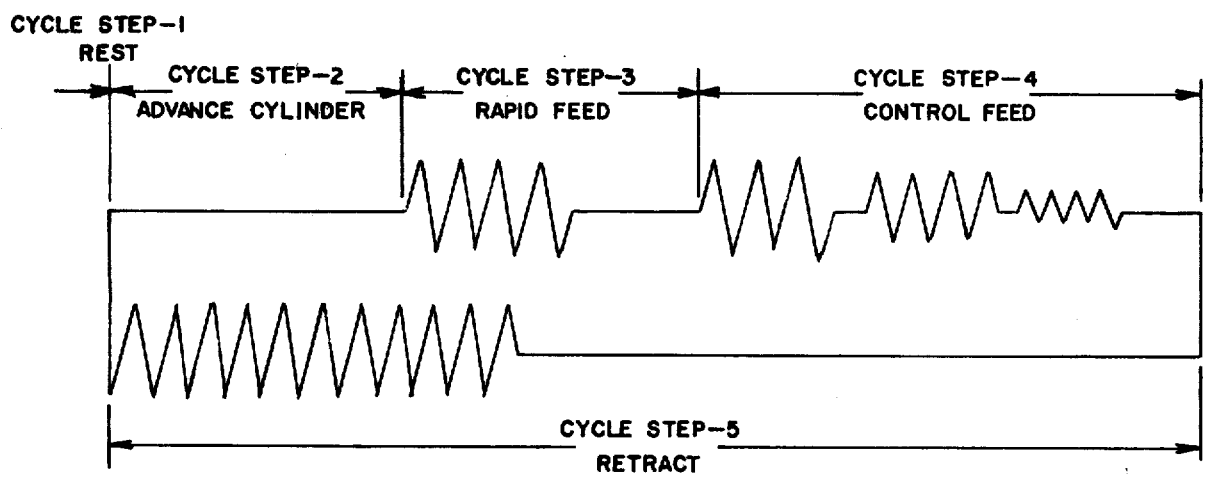

| CYCLE | CYCLE STEP | CYCLE INPUT SIGNAL |
|---|---|---|
| 1—INFEED CYCLE | 1—REST | 1—REVERSE LIMIT SWITCH<br>2—PART LOADED<br>3—CYCLE START PB |
| | 2—ADVANCE CYLINDER | 1—CYLINDER FORWARD<br>2—FORWARD LIMIT SWITCH |
| | 3—RAPID FEED | 1—MOTOR CW<br>2—MOTOR STOP<br>3—GAGE ADVANCED |
| | 4—CONTROL FEED | 1—MOTOR CW<br>2—COARSE END POINT<br>3—MEDIUM END POINT<br>4—FINE END POINT<br>5—MOTOR STOP<br>6—FINAL SIZE |
| | 5—RETRACT | 1—CYLINDER REVERSE<br>2—MOTOR CCW<br>3—MOTOR STOP<br>4—TACH ERROR<br>5—REVERSE LIMIT SWITCH |

Fig. 2

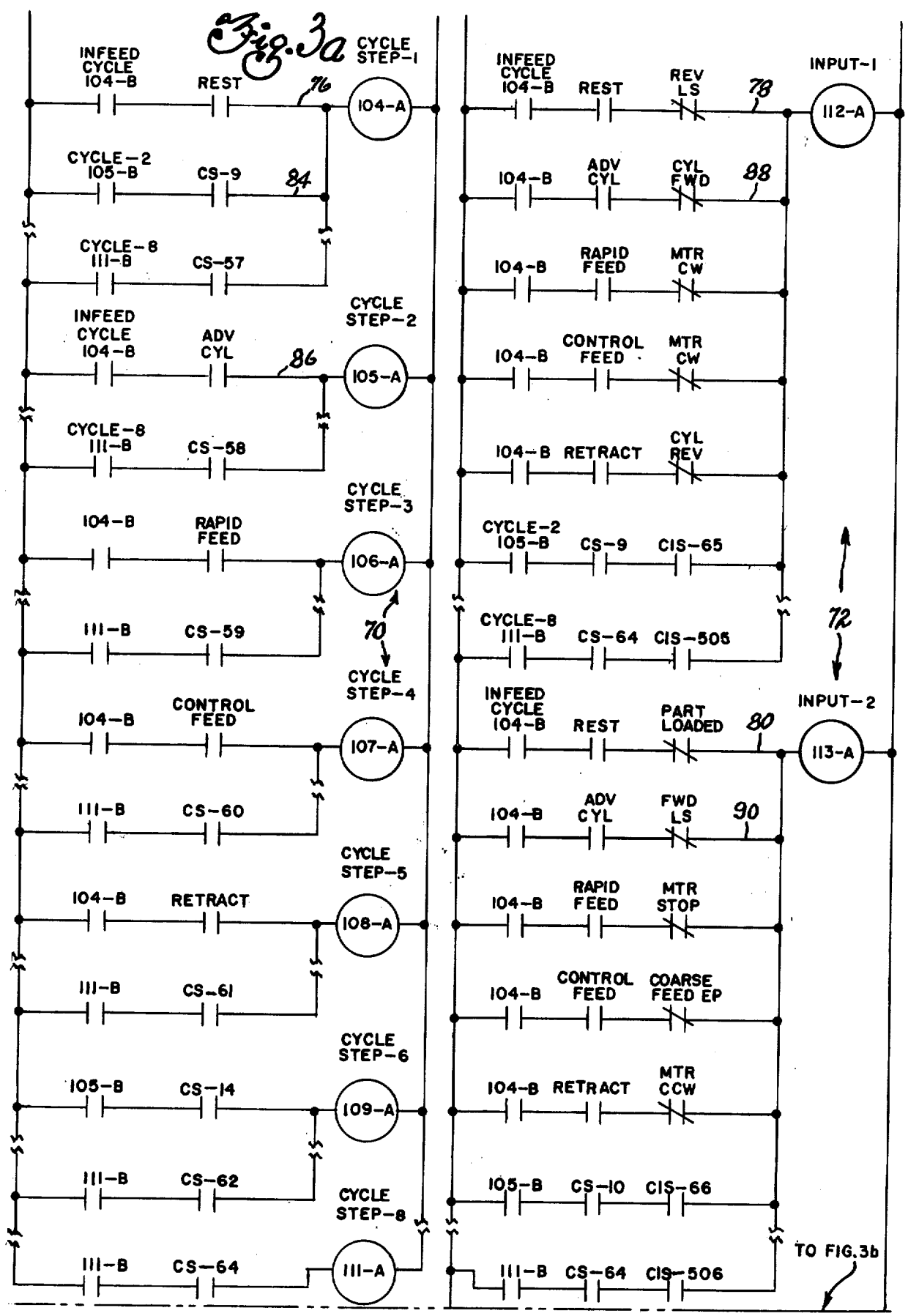

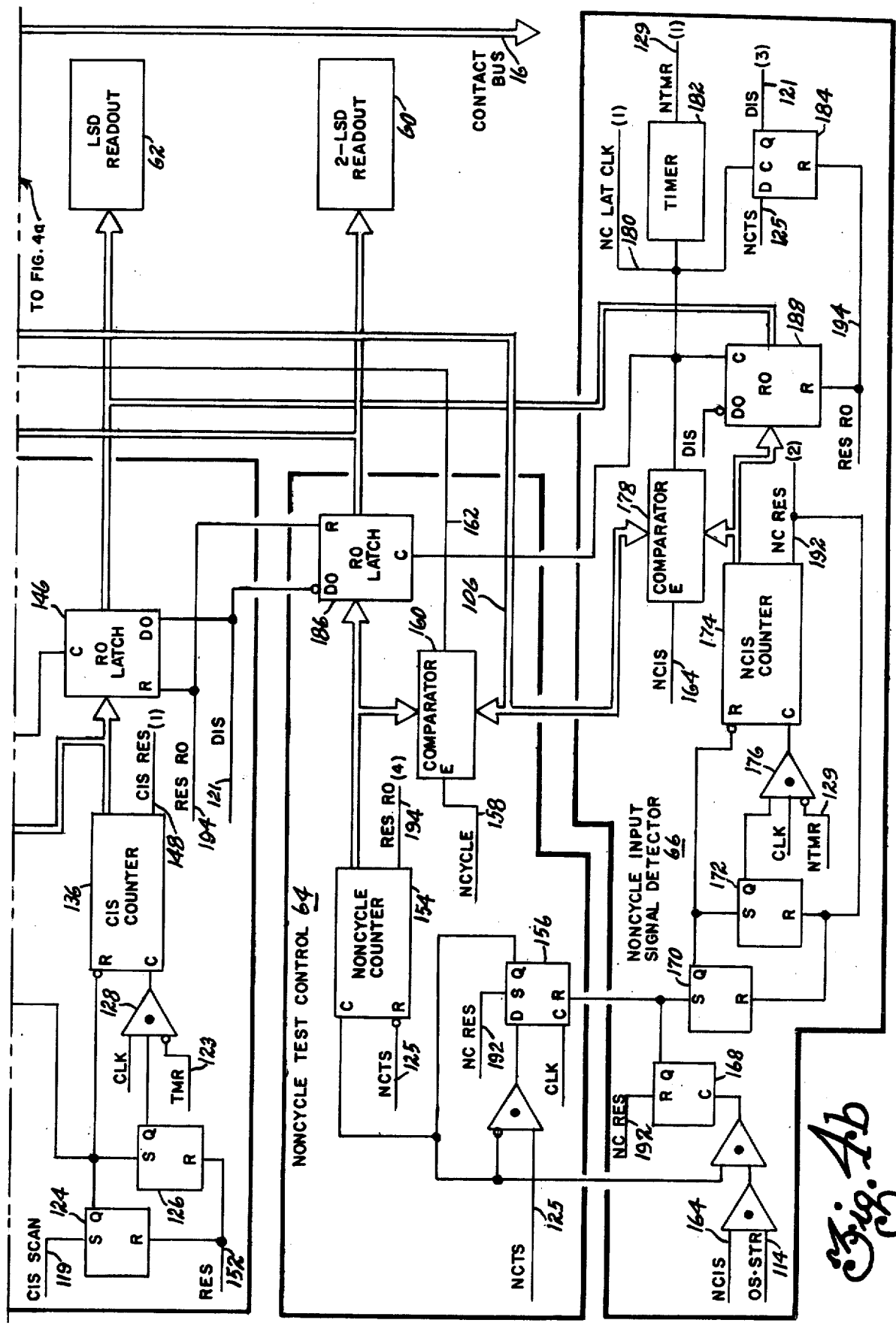

ASYNCHRONOUSLY OPERATING SIGNAL DIAGNOSTIC SYSTEM FOR A PROGRAMMABLE MACHINE FUNCTION CONTROLLER

BACKGROUND OF THE INVENTION

The invention relates generally to the area of programmable machine function controllers; and specifically, the invention provides an improvement thereto for detecting signal failures.

Diagnostic apparatus for sequential and cyclic operations have been known for many years. Typically, each cycle of operation is divided into a number of sequences or cycle steps, and a visual display is provided upon the successful completion of each sequence. Therefore, if the cycle stops, by observing the visual display, the operator can begin to diagnose the problem. However, the systems are unable to determine which signal in the system is missing and, therefore, preventing the cycle from progressing.

Through the years, these controls have developed in various ways. Typical of the development is the apparatus illustrated in U.S. Pat. No. 3,719,931 which illustrates a sequential machine function controller. Upon application of power, the control increments to a first sequence. This causes one or more output signals to be generated. Further, other signal lines representing desired input signals are energized in their proper order. Associated with the signal lines is a first set of visual indicators. Input signal converter circuits are responsive to the machine devices for producing the actual input signals. A second set of visual indicators is responsive to the converter outputs. A coincidence circuit compares the desired input signals with the occurrence of the actual input signals; and if complete coincidence exists, the control is incremented to the next sequence which generates a new set of output signals in a corresponding new set of desired input signals. If the control stops, the operator compares the two sets of visual indicators; and using a legend identifying the signals associated with the visual indicators, he then initiates further diagnostic action.

U.S. Pat. No. 3,939,453 discloses a similar system with several changes thereto. First, the multiple visual indicators are replaced by a single numeric display to identify the desired input signal which has not been satisfied by a corresponding actual input signal. Second, the display is further operative to numerically identify the current sequence of the control.

The systems described in these patents have several limitations. First, because the control is embodied by fixed circuit elements, its progression through the cycle of sequences is controlled by the rate at which the desired input signals are satisfied. This means that only a single error condition can be displayed at one time. Further, the systems can only control and diagnose a single independent cycle of operation. Independent and simultaneously occuring cycles of operation require a duplication of the elements illustrated. Finally, the prior art does not illustrate how the diagnostic system may be used to diagnose failures which are independent of any particular cycle of operation.

With the more recent commercial exploitation of programmable machine function controllers, a diagnostic system is feasible which has none of the limitations of the prior art devices. Typically, machine function controllers have a memory containing a machine function program which is continously scanned by the controller. The program defines which combination of input signals are required to generate an output signal. At points in time, when the programmed combination of input signals simultaneously exist, the controller generates the corresponding programmed output signal.

Using the diagnostic apparatus disclosed herein, an improved programmable machine function controller is provided which detects failures in independent but simultaneously occurring cycles of operation associated with the machine. Alternatively, if the controller is connected to a plurality of simultaneously operating machines, the diagnostic apparatus will continously display error conditions associated with the operation of all the machines. In addition, the diagnostic program gives the versatility of testing only certain inputs or only certain cycles of operation which may be chosen as a function of the known reliability of the elements involved. Further, because the diagnostics are defined by a separate diagnostic program in the controller, the diagnostic program may be easily changed to conform to changes in the machine control program. The diagnostic system operates asynchronously with the controller; therefore there is no real time correlation between the diagnostics operation and the machine control functions. This simplifies the machine control design problem and permits the machine control and diagnostics program to be designed separately. Finally, the asynchronous operation of the diagnostic apparatus permits the same apparatus to check failures of input signals which are not related to particular cycles of operation.

SUMMARY OF THE INVENTION

According to one embodiment of the invention, an improved programmable machine function controller is claimed. The controller is comprised of a memory for storing a machine control program representing a cycle of operation associated with a machine by defining unique combinations of input signals and output signals necessary to execute the cycle of operation. The controller further includes a timing circuit for continuously reading the memory and a processor circuit for generating the output signals to the machine in response to the occurrence of actual input signals corresponding to the desired input signals defined by the program. The improvement comprises a diagnostic program and apparatus as follows. The diagnostic program is stored in the memory and has program instructions for testing the condition of each of the actual input signals as it is required by the cycles of operations. The apparatus includes a first means which operates asynchronously from the controller for producing a first input signal indicating a test of one of the cycles of operation. Further means are responsive to the producing means for storing a first output signal from the controller representing a cycle step within the cycle of operation being tested. The apparatus includes other means for detecting a second output signal representing an error in the condition of an input signal as defined by the diagnostic program. Further, means are provided for displaying representations of the first input signal and the first and second output signals.

BRIEF DESCRIPTION OF THE DRAWINGS

FIG. 2 is an example of a cycle of operation to which the diagnostic apparatus may be applied.

FIGS. 3a and 3b when joined along the indicated junction line illustrate a ladder diagram from which a diagnostic program may be derived from the example shown in FIG. 2.

FIGS. 4a and 4b when joined along the indicated junction line illustrate a detailed block diagram of the disgnostic apparatus illustrated generally in FIG. 1.

DESCRIPTION OF THE PREFERRED EMBODIMENT

Figure 1:
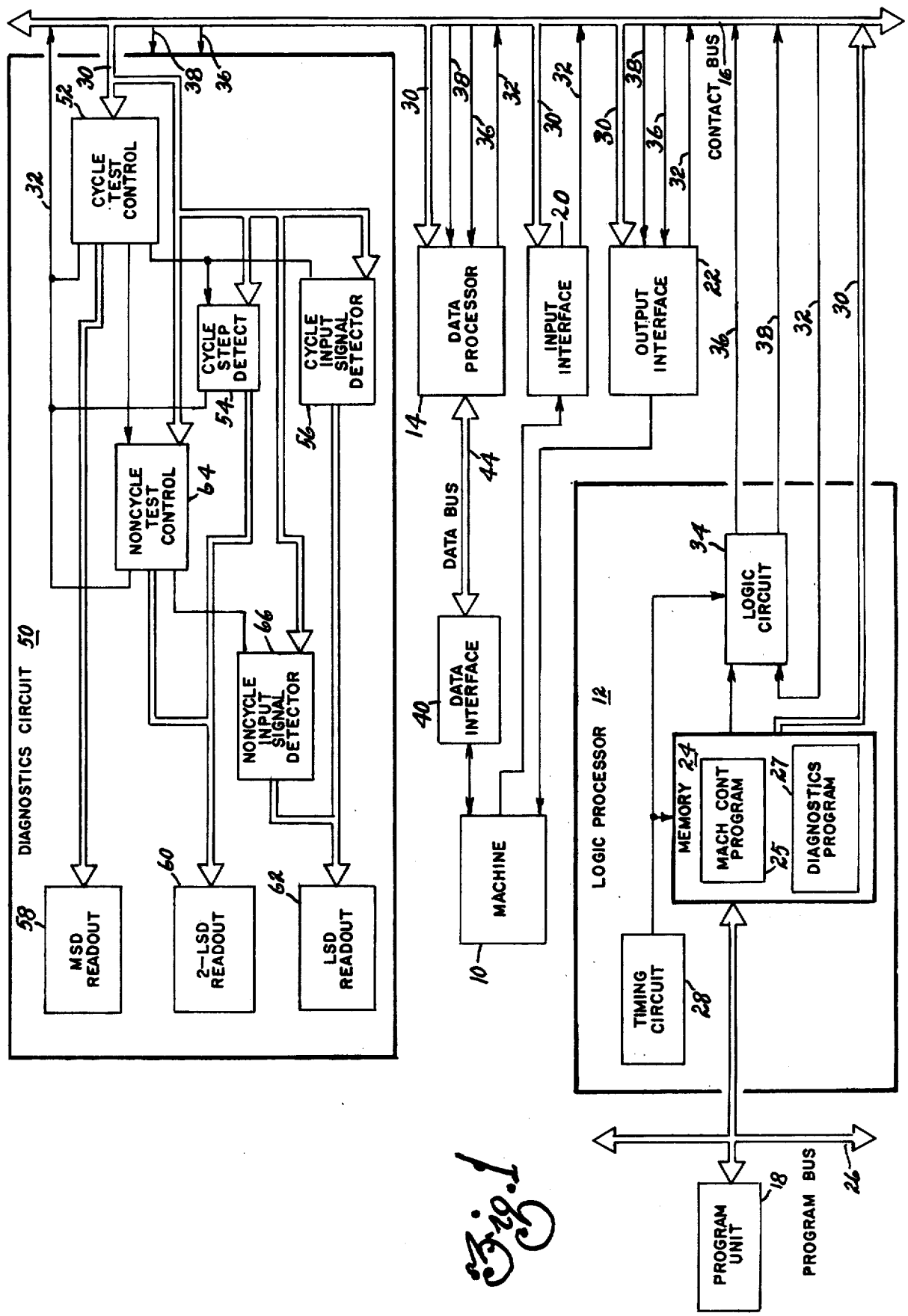
FIG. 1 is a general block diagram illustrating the relationship of the diagnostic apparatus to a programmable machine function controller.

FIG. 1 is a general block diagram illustrating the relationship of the diagnostic apparatus to a programmable machine function controller. The functional operation of a machine 10 is controlled by a machine controller comprised of a logic processor 12, an optional data processor 14, interface circuits 20 and 22, and an interconnecting single data bit contact bus 16.

The functional operation of the machine may be schematically represented by a ladder or relay diagram. Using this diagram in conjunction with a program unit 18, a program may be created. Each step in the program will typically include a device address and the logic function associated therewith. The combination of these two pieces of information is defined as a memory word. In the preferred embodiment, blocks of device addresses are allocated and preassigned according to the devices present, e.g. external coils, external contact inputs, timers, data processor functions, diagnostic functions, etc. Using the program unit 18, a programmer selects a starting memory location and works through the ladder diagram serially along each line. Therefore, each memory word will contain an element definition, e.g., no operation, output, input, a device address within a preassigned block associated with that element, if applicable, and other necessary functional information relative to the condition of the addressed device, e.g. normally open or normally closed contact state. After the program has been completed, the program unit 18 may be used to transfer the program to the memory 24 of the logic processor 12 via the program bus 26. The memory 24 has the capacity to store a machine control program 25 and a diagnostic program 27. A timing circuit 28 is operative to continuously scan the memory 24.

As each memory word is read, the device address is transmitted to the contact bus 16 via a contact address bus 30. If the device address represents an input element, the input interface 20 will respond to the device address on the address bus 30 to energize a circuit therein which is connected to receive the state of a corresponding input device located on the machine 10. The state of this addressed input device is transmitted along a contact status line 32 via the contact bus 16 to a logic circuit 34 within the logic processor 12. The logic circuit 34 is operative to determine whether or not the actual contact states agree with the programmed contact states. As long as there is agreement between the programmed and actual states, the logic circuit remains in a set state. If the programmed and actual conditions disagree, the logic circuit is reset.

Upon scanning a memory word, having a device address corresponding to an output coil, the output interface 22 will decode the device address. Further, each time the logic processor decodes an output element in a memory word, an output strobe signal is generated on an output strobe line 36. If the logic circuit has detected a continuous correspondence between the actual and programmed conditions of the input devices, when a memory word containing an output element is decoded, the logic circuit 34 will produce an output signal in its set state on the output state line 38. The output interface 22 stores the output signal on the output state line 38 in response to an output strobe signal on line 36. The output signal energizes an element on the machine 10 corresponding to the device address decoded by the output interface 22. This device remains energized until the logic circuit 34 determines that the conditions of the input devices associated with that output element do not correspond with the programmed conditions and produces the output signal in its reset state on the output state line 38. Therefore, elements on the machine 10 may be controlled as a function of desired conditions of other elements on the machine. It should be noted that the logic processor 12 is only capable of making simple logic decisions.

If the output device on the machine must be controlled in accordance with an arithmetic function, a data processor 14 may optionally be connected to the contact bus 16. The data processor operates asynchronously with the logic processor and executes programs of arithmetic instructions which are selected by output signals from the logic processor. If the program requires data from the machine for its execution, this data may be obtained from the machine 10 by means of a data interface 40 and data bus 44. A programmable machine function controller as generally described above is described in detail in a copending U.S. patent application Ser. No. 677,712 entitled Asynchronous Dual Function Multiprocessor Machine Control which is assigned to the present assignee. Further the same machine controller is commercially available from Cincinnati Milacron Inc.

If a failure occurs during the operation of the machine, the logic circuit 34 will not generate the appropriate output state signals. However, the machine control continues through its scanning and testing operation, but the operator knows a problem exists because the machine operation is stopped. As will be appreciated by those who are skilled in the art, without any diagnostic procedure, the location of the failure would be a very time consuming problem. To alleviate this situation, a diagnostic apparatus is disclosed which is comprised of a diagnostic program 27 contained in the memory 24 and a diagnostic circuit 50 which operates in conjunction with the diagnostic program. The diagnostic circuit functions to continuously display a representation of the input signals which are not in their proper state as required by the machine control program.

As will be described in more detail, the diagnostic program has the capability of diagnosing a predetermined number of cycle steps, e.g. 64; and, the program can test a predetermined number of input signals, e.g. eight, which are associated with each cycle step. Further, the cycle steps may be grouped into a combination of cycles of operation thus enabling the diagnosis of simultaneously occurring cycles of operation on a single machine or the diagnosis of a cycle of operation of different machines being controlled simultaneously by the machine controller. The only limitation in combining the cycle steps in different cycles is that the total number of cycle steps may not exceed the predetermined number, and only one cycle step can be tested at any one time in each cycle of operation.

Associated with the diagnostic program is the diagnostic circuit 50. Within the circuit 50, cycle test control 52 operates asynchronously with the logic processor 12 and is operative to initiate and control the operation of the diagnostic circuit. The cycle test control 52 cyclically and sequentially increments through numbers representing the cycles of operation. Initially, the cycle test control 52 produces a first input signal representing a first cycle of operation, and this signal is maintained for at least one complete scan of the logic processor 10 memory 24. During the scan of the diagnostic program in the memory 24, the logic processor interrogates the contact bus to determine the state of a first programmed contact representing the first cycle of operation. In response to this, the cycle test control generates the first input signal on the contact bus thereby representing a closure of the first contact. The logic processor continues its scan of the diagnostic program and interrogates the contact bus to determine the state of a second programmed contact representing a cycle step associated with the first cycle of operation. If the logic processor detects a closure of this contact, it generates a first output signal in its set state on line 38. In response to an output strobe signal on line 36, the cycle step detector 54 stores a number derived from the first output signal address on address bus 30 and representing the cycle step under test. Continuing in its scan of the diagnostics program, the logic processor interrogates the contact bus to determine the state of a specific input signal associated with the cycle step under test. In this case, a contact closure represents an undesirable state of an input signal, i.e. an input signal failure. Upon detecting an input signal failure, the logic processor produces the set state of a second output signal the address of which numerically identifies the input signal which has failed. The input signal detector 56 is responsive to the set state of the second output signal for initiating the operation of the readouts 58, 60 and 62 to display numerical representations of the first cycle of operation, the cycle step under test and the input signal which has failed, respectively. The display is held for as long as the input signal remains in its undesirable condition. If the diagnostics circuit detects more than one input signal failure, each of these signals with their associated cycle of operation and cycle step is successively displayed for a predetermined period of time, e.g. one or more seconds. If no input signal failures are detected, the display remains at zero. By observing the readouts, an operator uses a listing of the numerical representations to identify the failure and initiate corrective action.

Associated with the operation of every machine are a number of input signals which are independent of any particular cycle of operation, e.g., lube failure, hydraulic pressure, electrical overloads, temperature limits. The diagnostic circuit 50 contains elements which are operative to check these noncycle input signals. The noncycle test control 64 cyclically and sequentially increments through numbers representing groups of noncycle input signals to be tested. At a time determined by the cycle test control 52, the noncycle test control 64 produces a second input signal associated with a first group of noncycle input signals to be tested. During the scan of a further portion of the diagnostics program 27 in the memory 24, the logic processor interrogates the contact bus to determine the state of a programmed contact representing the first group of noncycle input signals. In response to this, the noncycle test control 64 generates the second input signal on the contact bus thereby representing a closure of the programmed contact. Continuing in its scan of the diagnostics program in the memory 24, the logic processor interrogates the contact bus to determine the state of a specific noncycle input signal associated with the first group of signals. As before, in this case, a contact closure represents an undesirable state of the noncycle input signal. Upon detecting the failure of a noncycle input signal, the logic processor produces the set state of a third output signal the address of which identifies the noncycle input signal which has failed. The noncycle input signal detector 66 is responsive to the set state of the third output signal to operate the readouts 58, 60 and 62. In this case, the MSD readout 58 displays a numeric representation of the noncycle test mode, 2-LSD readout 60 displays a numeric representation of the group of noncycle input signals under test, and LSD readout 62 displays a numeric representation of the specific noncycle input signal which has failed. As previously described, an operator uses a listing correlating the specific noncycle input signals with the numbers displayed to identify the failure and initiate corrective action.

FIG. 2 is an example of a cycle of operation to which the diagnostic apparatus may be applied. As mentioned earlier, the cycle steps available for test may be divided into a number of cycles of operation. In the example of FIG. 2, an infeed cycle for a grinding machine is defined as cycle - 1. Cycle step 1 within cycle - 1 is defined as the rest position of the wheelhead. During cycle step 2, the wheelhead is rapidly advanced by means of a hydraulic cylinder. During cycle step 3, the wheelhead experiences a rapid feed motion which is terminated; and thereafter, a gauge device is advanced to calibrate the workpiece size. In cycle step 4, the wheelhead experiences a coarse, medium and fine feed after which a dwell cycle is used to bring the part to its final size. Cycle step 5 causes the wheelhead to retract back to its rest position. This motion is comprised of a reverse rapid feed in addition to a reverse motion of the cylinder. Referring to the table in FIG. 2, associated with each cycle step are cycle input signals which are to be tested by the diagnostic program. For example, before the machine can progress from cycle step 1 to cycle step 2, the reverse limit switch must be picked up, a part must be loaded and the cycle start push button must be depressed. Likewise, to progress from cycle step 2 to cycle step 3, the hydraulic cylinder must be actuated in the forward direction; and it must pick up the forward limit switch which terminates its action. Therefore, the table in FIG. 2 represents the cycle input signals which are to be tested for each of the cycle steps within the infeed cycle of operation.

Figure 3B:
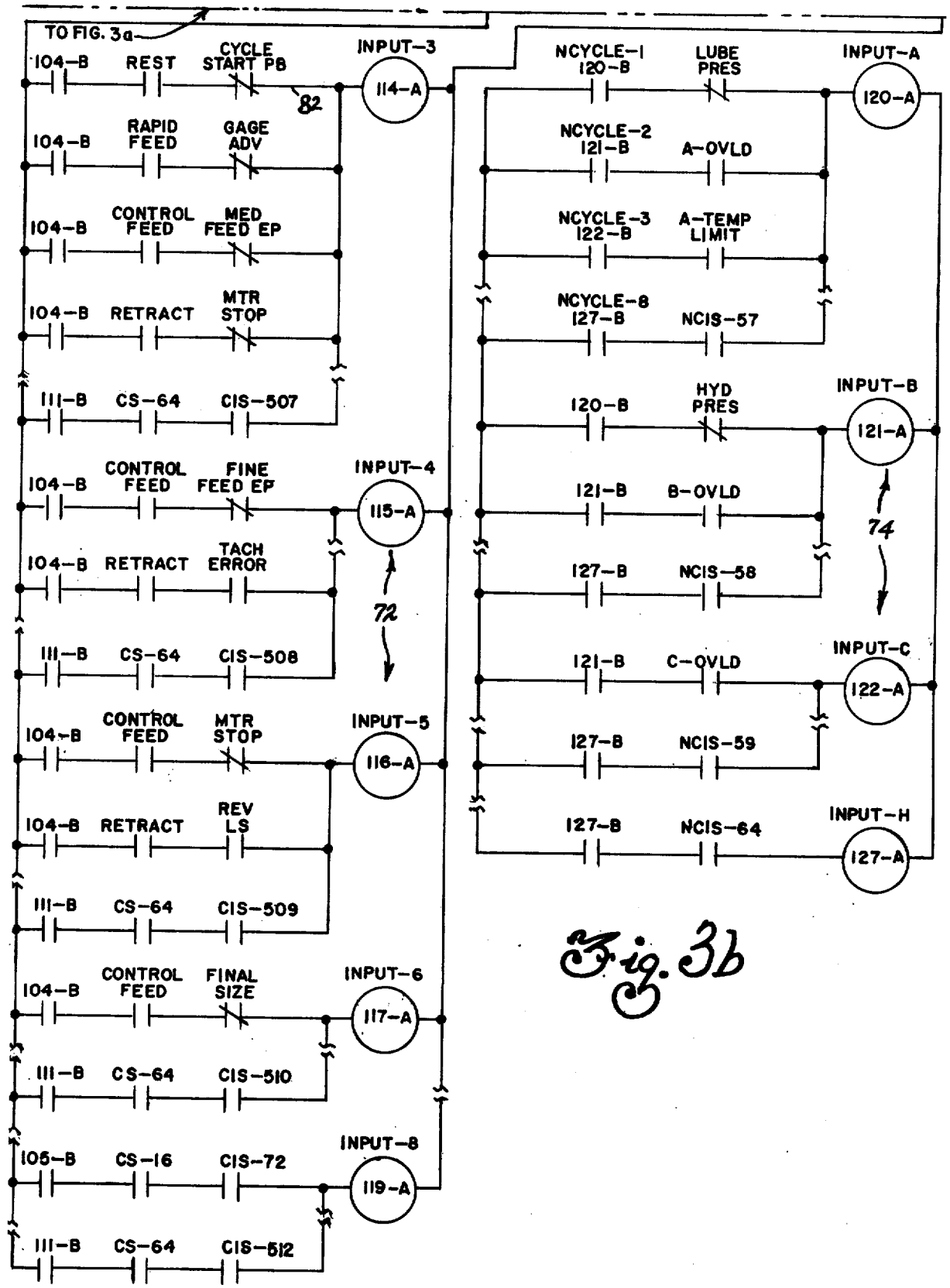

FIGS. 3a and 3b when joined along the indicated junction line illustrate a ladder diagram from which a diagnostic program of the example shown in FIG. 2 may be derived. The ladder diagram is comprised of three separate ladder diagrams which have basically the same format for every diagnostic program. A first ladder diagram shown at 70 is responsive to a first input signal from the diagnostics circuit and a second simultaneously occurring input signal representing a cycle step to produce a first output signal to the diagnostic circuit indicating the cycle step under test. A second portion of the ladder diagram shown at 72 is responsive to the input signals defining the cycle step under test and is further responsive to another input signal representing the specific cycle input signal to be tested within the cycle step.

It should be noted that the ladder diagram is drawn to produce a second output signal when the input signal under test is in its undesired or error state. In other words, when testing the contacts defining the specific input signals, the detection by the logic processor of an open contact is interpreted as a nonfailure condition. Therefore, unused lines or capacity within the diagnostics program may be left unprogrammed which is a great convenience to the user. Therefore, when the diagnostic circuit receives the second output signal it displays a representation of the first input signal and the first and second output signals thereby indicating the input signal under test which has failed. A third portion of the ladder diagram is shown at 74. This portion of the ladder diagram is used to test noncycle input signals.

Returning to the portion of the ladder diagram shown at 70, assume the diagnostics circuit has produced a first input signal representing a first cycle of operation which in the case of FIG. 2 is the infeed cycle. The logic processor 12 scans the diagnostic program in exactly the same manner as it does the machine control program. In scanning the first line 76 in the ladder diagram, the logic processor produces the address 105-B to the contact bus in search of an input signal corresponding thereto. As discussed earlier, certain blocks of device addresses are preassigned certain functions. In the case of diagnostics, 24 numerical addresses are preassigned thereto. Eight of these 24 are allocated to identify the cycles of operation and the cycle steps. Another digit in the memory word is used to determine whether or not the address is an A or B address. The A group of the first eight numerical addresses are arbitrarily assigned to represent cycle steps, and the B group of the first eight numerical addresses are arbitrarily assigned to represent cycles of operation. The next eight numerical addresses defined only within the A group identify the cycle input signals being tested. The A group of the third set of eight numerical addresses is arbitrarily associated with the noncycle input signals, and the B group of the final group of eight numerical addresses is arbitrarily assigned to represent the noncycle groups of the signals. In the example of FIGS. 3a and 3b, the 24 addresses associated with the diagnostics program example is the numerical group of 104 through 127.

The ladder diagram of FIGS. 3a and 3b is drawn to illustrate eight potential cycles of operation with eight cycle steps associated with each cycle of operation. In addition, eight input signals may be tested relative to each cycle step. Similarly, eight noncycle groups are illustrated with a potential of eight noncycle input signals being tested for each noncycle group.

As discussed earlier, the diagnostic circuit produces first input signals representing cycles of operation. Each first input signal lasts for duration at least equal to the time required for the logic processor to scan the memory 24. As the logic processor scans the diagnostics program represented by the ladder diagram 70, it interrogates the contact bus to determine the state of the first contact representing a cycle of operation. The logic processor will interpret the presence of the first input signal as a contact closure and proceed to determine the state of a serial contact representing a cycle step associated with the current cycle of operation under test. If a contact closure is detected indicating the cycle step is active, the logic processor generates the set state of a first output signal represented by the coils in the ladder diagram 70. This set state is detected by the diagnostics circuit.

The logic processor then proceeds to scan the diagnostics program represented by the ladder diagram 72. The first two contacts represent the cycle of operation and cycle step under test. Assuming these contact closures still exist, the logic processor then interrogates the contact bus to determine the state of a particular cycle input signal. As discussed earlier, the error state of this signal is tested. If an error condition exists, the coil in the ladder diagram 72 generates the set state of a second output signal. The diagnostic circuit will detect the set state of the second output signal and cause the readouts to generate representations identifying the cycle of operation, cycle step, and cycle input signal which has failed.

It should be remembered that only one cycle step can be active at any one time in each cycle of operation. To demonstrate, refer back to the table shown in FIG. 2. In cycle step 1, it is desired to check three cycle input signals. Referring to the ladder diagram 70 in line 76, contact 104-B represents the infeed cycle of operation. The next contact in line 76 represents cycle step 1 or the rest position. Therefore, if the logic processor detects that the diagnostic circuit has produced a first input signal to the contact bus representing cycle 1, and further detects that the machine control program has produced a signal representing the rest cycle step, coil 104-A will produce a first output signal to the contact bus representing that the rest cycle step within the infeed cycle is being diagnosed. The logic processor 12 continues its scan of the ladder diagram until it reaches line 78. At this point, the logic processor detects continuity through the contact 104-B and the rest contact and checks the condition of the reverse limit switch representing the first cycle input signal test. The contact state of the limit switch is normally open; but since the program is testing for the picked up state, the diagnostic program illustrates a normally closed contact to check the error condition. Consequently, if the limit switch is picked up, the normally closed contact within the diagnostic program will be open; and an error will not be generated. If the limit switch is not picked up, the normally closed contact in the diagnostic program will produce the set state of a second output signal to the contact bus which is detected and displayed by the diagnostic circuit.

The logic processor continues its scan through the diagnostic program until it reaches line 80. Again, as in line 78, contact 104-B represents the infeed cycle, the rest contact represents cycle step 1, and the part loaded contact is the second cycle input signal to be tested. The logic processor continues in its scan until it reaches line 82 (FIG. 3b) of the diagram at which point the cycle start push button is tested. It should be noted that the combination of the infeed cycle and the rest cycle step do not occur in subsequent portions of the ladder diagram. Consequently, the diagnostics program only checks the cycle input signals which are actually used. It does not scan all possible signals. Referring back to the ladder diagram 70, of FIG. 3a, line 84 illustrates that the first output signal will be generated to the contact bus if cycle-2 and cycle step 9 exist simultaneously. Consequently, it can be readily observed that the cycle step 1 coil 104-A may be picked up in any one of eight situations; each situation being unique to a different cycle of operation.

In the logic processor scan of the diagnostic program, line 86 illustrates that if the diagnostic circuit is producing a first input signal representing the infeed cycle, and the machine control program has activated the advance cylinder contact, the cycle step 2 coil 105-A will pick up and produce the set state of an output signal to the contact bus. The cycle input signals to be tested in cycle step 2 are illustrated in lines 88 and 90 of the ladder diagram 72. Therefore, given a table as shown in FIG. 2 listing cycles of operation associated cycle steps, and related cycle input signals, a ladder diagram may be drawn which is operative to test each of the cycle input signals at a time when they are required by a particular cycle step during a cycle of operation. The format of the ladder diagram is fixed so that all that need be done is assign the correct addresses to the contacts and coils. In a manner well known in the art, given the ladder diagram shown in FIGS. 3a and 3b, the programming unit 16 may be used to generate a diagnostic program 27 and transfer the program to the memory 24 of the logic processor 12.

Figure 4A:
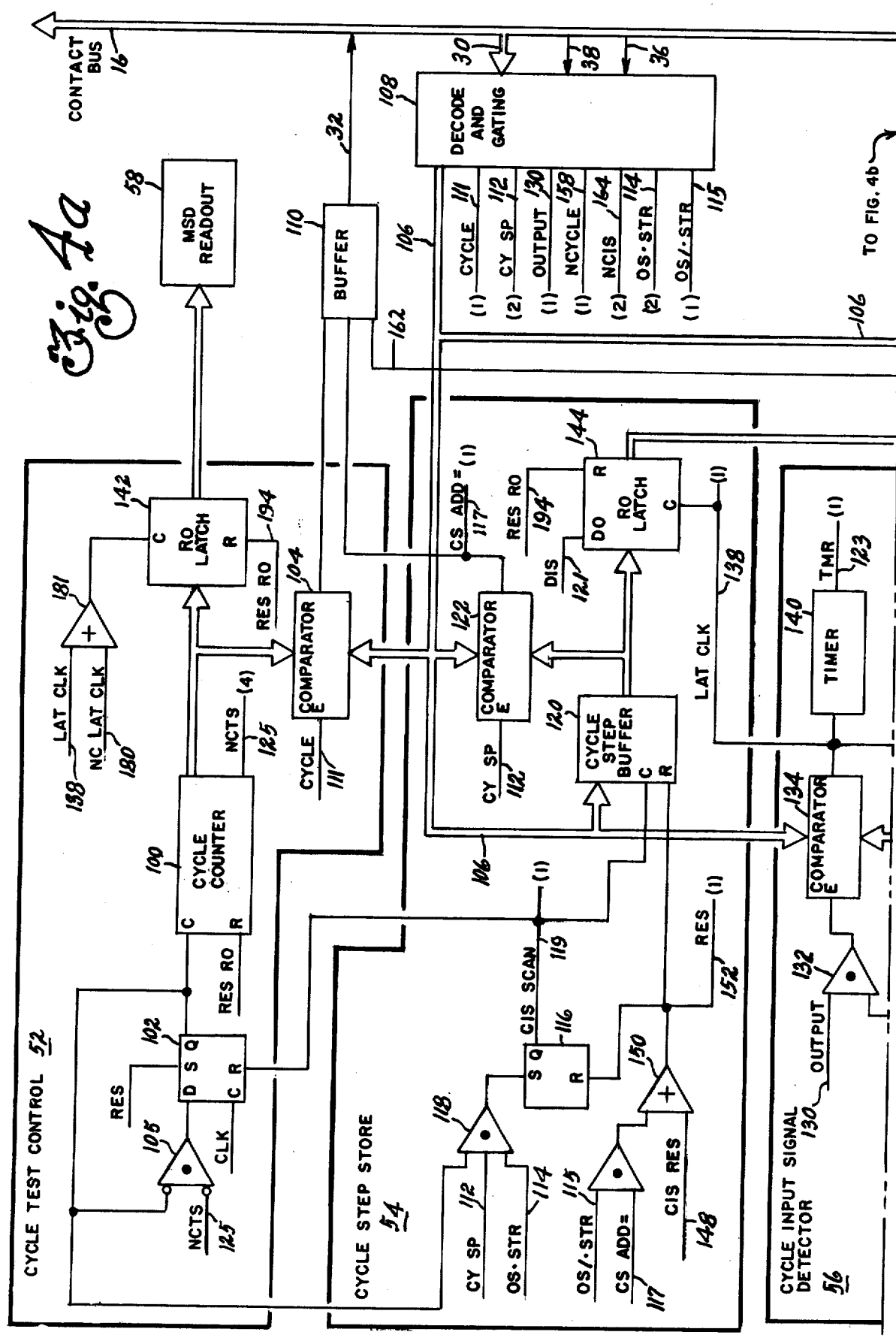

FIGS. 4a and 4b when joined along the indicated junction line illustrate a detailed block diagram of the diagnostic apparatus illustrated generally in FIG. 1. A cycle start flip-flop 102 is clocked by a clock signal to produce an output signal to clock a cycle counter 100 which produces a first number representing cycle 1. The output from flip flop 102 is fed back to gate 105 to prevent the cycle start flip flop from being clocked with further clock pulses. The first number from the cycle counter 100 is one input to a comparator 104 having a second input responsive to a bus 106 from a decode and gating circuit 108. The decode and gating circuit 108 is responsive to the address bus 30, the output strobe signal on line 36 and output state signal on line 38. While the first number is maintained by the cycle counter 100, the logic processor 12 is scanning the memory 24 containing the diagnostic program. When it reaches a point in the program in which it is testing for the presence of a cycle of operation corresponding to the first number, the comparator 104 in response to a cycle signal on line 111 detects an equality between the first number and a number on bus 106 derived from the address on the address bus 30. Upon detecting the equality, the comparator 104 generates a first input signal back to the contact bus via the contact status line 32 and buffer 110. After receiving the first input signal, the logic processor moves to the next contact in the line of the ladder diagram and tests for an input signal representing a cycle step associated with the cycle under test. If it finds this cycle step is active in the machine control program, a first output signal is generated in its set state. The decode and gating circuit 108 generates a cycle step signal on line 112 which in combination with the output state and strobe signal on line 114 is operative to set the cycle input signal (CIS) scan flip flop 116 via the gate 118.

The CIS scan signal on line 117 holds flip flop 102 and is operative to clock a number corresponding to the address of the first output signal into a cycle step buffer 120. A comparator 122 compares the number in the cycle step buffer 120 with the current number on the bus 106. If the numbers are equal, another input signal on line 117 is generated to the contact bus via the contact status line 32 and buffer 110. If during subsequent memory scans, the output signal changes state, the not output and strobe signal on line 115 and the input signal on line 117 will reset the cycle step diagnostic circuit. The CIS scan signal is also operative to set flip flop 124 which in turn sets flip flop 126 thereby removing the reset from counter 136 and the inhibit from gate 128. As the logic processor moves through its scan of the ladder diagram, assume it picks up an input coil which produces a second output signal in its set state representing an error condition in one of the cycle input signals. The decode and gating network 108 is responsive to this and produces an output signal on line 130 to the gate 132. In response to the occurrence of the output state and strobe signal on line 114, the comparator 134 is enabled to compare a number corresponding to the address of the second output signal with the number from the CIS counter 136. The clock signal on the input of gate 128 continuously clocks the CIS counter producing successive numbers on its output. When the comparator 160 detects an equality between the numbers on its inputs, it produces a latch clock signal on line 138. The latch clock signal energizes a timer 140 which generates a signal on line 123 to inhibit further clockings of the CIS counter 136. Further, the latch clock signal clocks the readout latches 142, 144 and 146. These latches hold numbers identifying the first input signal, the first output signal and the second output signal so they may be decoded and displayed by the readouts 58, 60 and 62.

After the CIS counter has cycled through the full range of cycle input signal numbers, it generates a CIS reset signal on line 148. This signal via gate 150 generates a reset signal on line 152, thereby resetting flip flops 124, 126 and setting flip flop 102. The setting of flip flop 102 causes the cycle counter 100 to increment to the next cycle number. The diagnostic circuit continues to function in a cyclic manner as just described until the cycle counter has counted through the full range of numbers associated with all the cycles of operation.

On its next count, cycle counter 100 produces a noncycle test signal on line 125. This removes the reset from the noncycle counter 154 and further allows flip flop 156 to generate an output thereby clocking the counter 154. The counter 154 produces a number corresponding to the first group of noncycle input signals to be tested. As the logic process proceeds through the diagnostic program, and checks for the presence of a test of the first noncycle group, the decode and gating circuit will produce a noncycle signal on line 158 as well as a number associated therewith on the bus 106. The comparator 160 is responsive to the noncycle signal to compare the number from the counter 154 with the current number on the bus 106. If a correspondence occurs, a second input signal is generated on line 162 back to the contact bus via the contact status line 32 and buffer 110.

This allows the logic processor to check the next contact in the line of the ladder diagram which represents a specific noncycle input signal. If the processor detects a failure in this signal, a third output signal is generated; and the decode and gating circuit 108 is responsive thereto to produce a noncycle input signal (NCIS) on line 164 and a corresponding output state and strobe signal on line 114. These signals are operative to set the flip flop 168 which in turn sets the flip flops 170 and 172. The reset on the NCIS counter 174 is removed, and the counter is clocked via the gate 176. The counter produces numbers corresponding to the range of numbers assigned to the noncycle input signals. The comparator 178 is enabled by the NCIS signal and compares the number from the counter 174 with the number on the bus 106 associated with the NCIS signal.

When a correspondence occurs, the comparator produces a NC latch signal on line 180. This signal is operative to energize a timer 182 which inhibits further clocking of the counter 174 by the gate 176. Further, the NC latch signal clocks a disable flip flop 184 which produces a disable signal on line 121 to disable the outputs of the latches 144 and 146. In addition, the NC latch signal clocks the latches 186 and 188 which are operative to temporarily store the numbers associated with the noncycle group being diagnosed and the noncycle input signal which has failed. These signals are decoded and displayed by the readouts 60 and 62. Finally, the NC latch signal clocks latch 142 via OR gate 181 thereby causing, the readout 58 display a number from the cycle counter 100 uniquely associated with the noncycle test signal.

At the end of the predetermined time period defined by the timer 182 a noncycle timer signal on line 129 clocks, the NCIS counter 174 through its count cycle. At the end of the count cycle, it produces a noncycle reset signal on line 192. The noncycle reset signal is operative to reset flip flops 168, 170 and 172 and set flip flop 156. Setting of flip flop 156 increments the noncycle test counter to produce another number representing the next noncycle group of input signals to be tested. The diagnostic circuit continues to function in this manner until the noncycle test counter has incremented through all the noncycle groups, after which it produces a reset readout signal on line 194 which is operative to reset all the latches 142, 144, 146, 186 and 188 and the cycle counter 100. At this point, the diagnostic circuit has cycled through one complete cycle; and the cycle counter 100 is ready to be again clocked by the flip flop 102 in response to the next clock pulse thereto.

In summary, the cycle counter 100 operates asynchronously with the logic processor 12. It sequentially generates input signals representing cycles of operation. As the logic processor scans the diagnostic program, these input signals are detected and allow the logic processor to proceed to test a cycle step within the cycle of operation being tested. When the cycle step is detected, the logic processor produces a first output signal in the set state which represents the cycle step. A number associated with this signal is stored in the cycle step buffer 120. The logic processor then proceeds to test the cycle input signal as defined by the diagnostic program. If a failure is detected, the second output signal is generated in its set state. This output signal is detected by the operation of the counter 136 and comparator 134. The diagnostic circuit is operative to produce a display of the numbers from the cycle counter 100, cycle step buffer 120 and CIS counter 136.

After the diagnostic circuit has scanned all the cycles of operation, it initiates a scan of the noncycle groups of input signals. In a similar manner, the noncycle test counter 154 produces a second input signal which is detected by the logic processor as it scans the diagnostic program and tests the noncycle groups. The processor then checks the noncycle input signals associated with each group. If a failure is detected, the logic processor produces a third output signal in its set state which is detected by the operation of the NCIS counter 174 and comparator 178. Thereafter, the diagnostic circuit is operative to display numbers representing the noncycle group and the noncycle input signal which has failed.

While the invention has been illustrated in some detail according to the preferred embodiments shown in the accompanying drawings, and while the preferred illustrated embodiments have been described in some detail, there is no intention to limit the invention to such detail. On the contrary, it is intended to cover all modifications, alterations and equivalents falling within the spirit and scope of the appended claims.

What is claimed is:

1. A programmable machine function controller of the type comprised in part of a memory having a first section containing a machine control program representing at least one cycle of operation associated with a machine, said cycle of operation being comprised of a number of cycle steps and each cycle step being defined by a number of cycle input signals, said machine control program defining the states of output signals being generated to a contact bus in electrical communication with the machine in response to predetermined states of the input signals, and said controller further comprising means for continuously and iteratively reading the memory and a logic circuit responsive to the memory for controlling the states of the output signals as a function of the actual input signal states corresponding to the input signal states defined by the program, wherein the improvement comprises:

a. a second section of said memory for storing a first diagnostic program defining a test of error states of selected cycle input signals associated with the particular cycle steps defining the machine cycles of operation, said diagnostic program being stored in the memory for controlling the testing of the states of the selected cycle input signals;
   b. means operating asynchronously with the controller for generating a first input signal to initiate a test of one of the machine cycles of operation;
   c. means responsive to the controller and the generating means for detecting a first output signal representing a particular cycle step in the one of the machine cycles of operation;
   d. means responsive to the controller and the generating means for detecting a second output signal representing an error state of one of the selected cycle input signals as defined by the first diagnostic program; and
   e. means having inputs responsive to the first input signal and the first and second output signals for displaying a representation of the inputs.

2. The controller of claim 1 wherein the improvement further comprises:

a. a third section of said memory for storing a second diagnostic program defining a test of error states of noncycle input signals independent of any machine cycle of operation, said second diagnostic program being stored in the memory for controlling the testing of the states of the noncycle input signals;
   b. means responsive to the generating means and connected to the controller for providing a second input signal to initiate a test of the noncycle input signals;
   c. means responsive to the providing means and the controller for detecting a third output signal representing an error state of one of the noncycle input signals as defined by the second diagnostic program and
   d. means having inputs responsive to the second input signal and a third output signal and an output connected to the displaying means for causing the displaying means to display a representation of the second input signal and the third output signal.

3. The controller of claim 1, wherein the second section of said memory further comprises:
   a. a first storage area for storing a first program operating in conjunction with the controller for producing the first output signal, said first output signal being generated in response to the simultaneous occurrence of the first input signal and a third input signal representing a cycle step associated with the cycle of operation being tested; and
   b. a second storage area for storing a second program operating it in conjunction with the controller for producing the second output signal, said second output signal being generated in response to the simultaneous occurrence of the first and third input signals and a cycle input signal being in an error state as defined by the second program.

4. The controller of claim 3, wherein the means for generating the first input signal further comprises:
   a. a cycle counter operating asynchronously with the controller for continuously and sequentially producing a set of cycle numbers, each cycle number having a duration approximately equal to the time required by the controller to read the memory one time, said cycle counter further producing a last cycle number signal; and
   means responsive to the cycle counter and the contact bus for comparing the cycle numbers with numbers corresponding to addresses on the contact bus and producing the first input signal in response to detecting an equality therebetween.

5. The controller of claim 4, wherein the means for detecting the first output signal further comprises:
   a. a buffer store responsive to each cycle number and the first output signal and connected to the contact bus for storing a cycle step number corresponding to the first output signal; and
   b. means responsive to the contact bus and the buffer store for comparing the stored cycle step number with numbers corresponding to addresses occurring on the contact bus and generating another input signal to the controller in response to an equality therebetween.

6. The controller of claim 5, wherein the means for detecting the second output signal further comprises:
   a. an input cycle counter responsive to the first output signal for sequentially producing cycle input numbers;
   b. means responsive to the second output signal for comparing each cycle input number with a number corresponding to the address of the second output signal to produce a latch signal in response to an equality therebetween;
   c. means responsive to the latch signal for producing a first timing signal of a predetermined duration;
   d. means responsive to the first timing signal and connected to the input cycle counter for inhibiting the operation of the input cycle counter for the predetermined duration thereby maintaining the cycle input number corresponding to the second output signal.

7. The controller of claim 6, wherein the input cycle counter further produces a final number for causing the cycle counter to increment from its current counter state to a successive counter state.

8. The controller of claim 7, wherein the display means further comprises a first latching means responsive to the latch signal for storing the current cycle number, cycle step number and cycle input number.

9. The controller of claim 2, wherein the third section of said memory further comprises a third storage area for storing a third program operating in conjunction with the controller for producing a third output signal, said third output signal being generated in response to the simultaneous occurrence of the second input signal and one of the noncycle input signals being in an error state as defined by the third program.

10. The controller of claim 9, wherein the providing means further comprises:
    a. noncycle counter means responsive to the last cycle number signal for sequentially producing a set of noncycle numbers; and
    b. means responsive to the noncycle counter means and the controller for comparing the noncycle numbers with numbers corresponding to addresses on the contact bus to produce the second input signal in response to an equality therebetween.

11. The controller of claim 10, wherein the means for detecting the third output signal further comprises:
    a. a noncycle input counter responsive to the third output signal for sequentially producing a number of noncycle input numbers;
    b. means responsive to the third output signal for comparing each noncycle input number with numbers corresponding to the address of the third output signal to produce a noncycle latch signal in response to an equality therebetween;
    c. means responsive to the noncycle latch signal for producing a second timing signal of the predetermined duration;
    d. means responsive to the second timing signal and connected to the noncycle input counter to inhibit the operation of the noncycle input counter for the predetermined duration thereby maintaining the noncycle input number corresponding to the third output signal; and
    e. means responsive to the noncycle latch signal and connected to said first latching means for disabling the output of the first latching means for the duration of the noncycle latch signal.

12. The controller of claim 11, wherein the causing means further comprises second latching means connected to the noncycle input counter and the noncycle counter means and responsive to the noncycle latch signal for storing the noncycle number and noncycle input number occurring at the time of the noncycle latch signal.

13. The controller of claim 12, wherein the displaying means is connected to the first and second latching means and further comprises:
    a. a most significant decimal digital display responsive to the cycle number;
    b. a second least significant decimal digital display selectively responsive to the cycle step number and the noncycle number as a function of the noncycle latch signal; and
    c. a least significant decimal digital display selectively responsive to the cycle input number and the noncycle input number as a function of the noncycle latch signal.

14. The controller of claim 13, wherein the noncycle counter means further produces a reset signal for resetting the disabling means, the first and second latching means and the cycle counter whereby the cycle counter may then be incremented to its initial state resulting in an iteration of the diagnostic cycle.

* * * * *